2,995,435
PROCESS OF TREATMENT AND UTILIZATION OF ACID WASTE LIQUORS RESULTING FROM THE PRODUCTION OF ACRYLATES AND METHACRYLATES

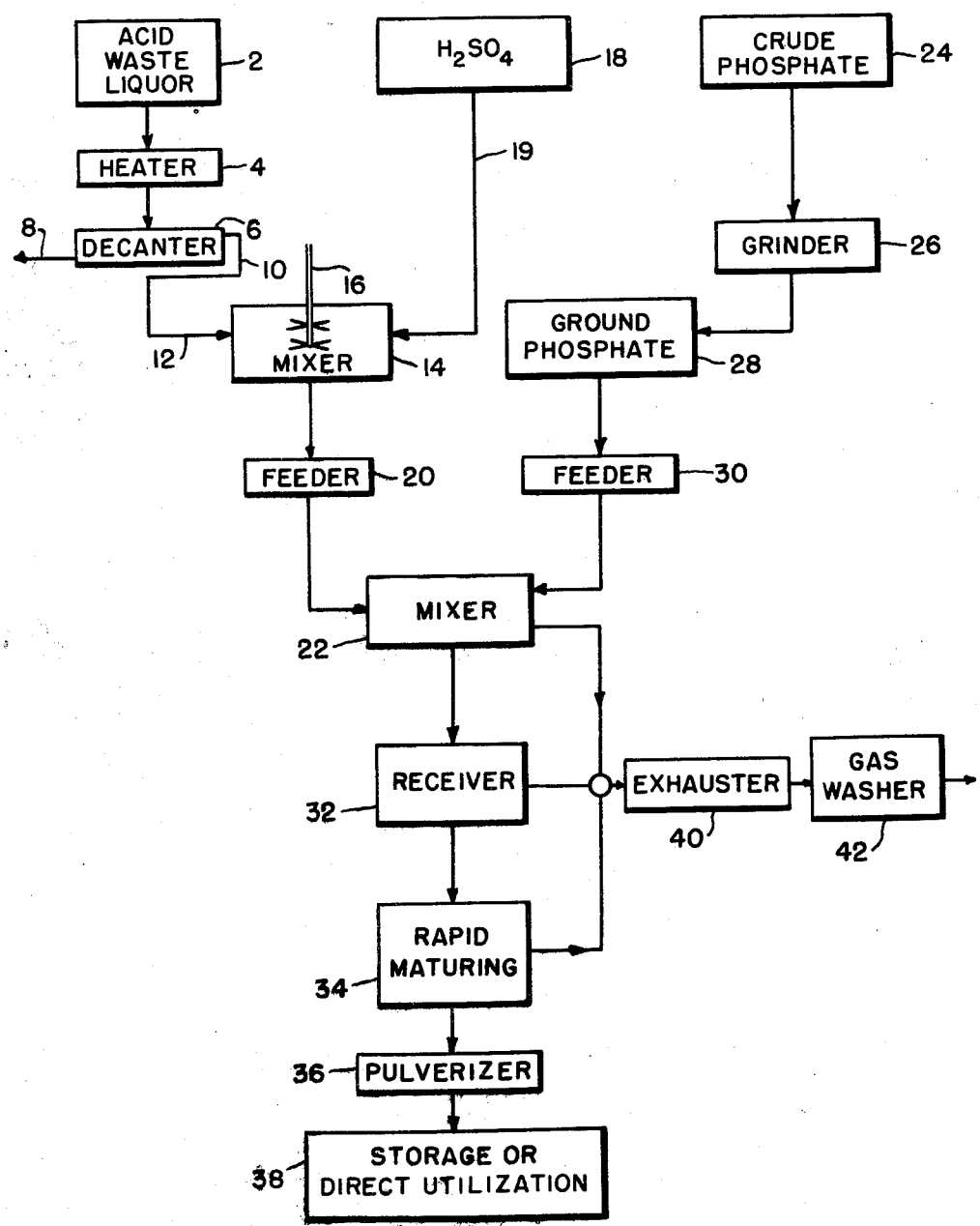

Pierre Hurel, Aunay-sous-Crecy, France, assignor to Société d'Electro-Chimie, d'Electro-Metallurgie et des Aciéries Electriques d'Ugine, Paris, France, a corporation of France
Filed Aug. 3, 1959, Ser. No. 831,377
Claims priority, application France Dec. 26, 1958
2 Claims. (Cl. 71—37)

The present invention relates to a process of treatment and utilization of acid waste liquors resulting from the production of acrylates and methacrylates.

It is known, for instance, to produce methyl methacrylate from acetone cyanhydrine, sulphuric acid and methanol.

This production is made in two reactive steps.

In the first step, acetone cyanhydrine is transformed into methacrylic amide in the presence of concentrated sulphuric acid. The double methacrylic bond is created by loss of water $H_2O$ from the tertiary alcohol function, and this water molecule hydrolyzes the nitrile function into amide function.

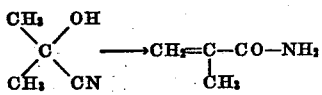

In the second step, the methacrylic amide in solution in sulphuric acid is esterified by methanol and water vapors into methyl methacrylate, while the hydrolysis of the amide function leads to the production of ammonium sulphate $(NH_4)_2SO_4$ due to the presence of sulphuric acid.

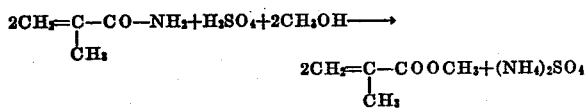

In industrial practice, use is made of sulphuric acid in excess in comparison with acetone cyanhydrine. The initial molar ratio of these reagents usually is about 1.5. After transposition and esterification, one should theoretically obtain a solution of ammonium sulphate in sulphuric acid in which the molar ratio of acid to sulphate is about 2, said concentration depending upon the temperature at the end of esterification.

But, in fact, at the end of the reaction, the totality of sulphuric acid is not recovered as free acid for a part of said acid has formed by-products with the various reagents. The molar ratio is generally between 1.80 and 1.84. Among the by-products are found addition products: mono and dialkyl sulphate of the isobutyric structure and of its dimer, methyl acid sulphate, etc. In the solution is also observed the unavoidable presence of methacrylic polymers which are mainly formed in the course of esterification.

The weight composition of these acid waste liquors from esterification is essentially as follows:

|  | Percent |
|---|---|
| $(NH_4)_2SO_4$ | 30 to 35 |
| $H_2SO_4$ | 40 to 45 |
| Percentage carbon in impurities | 4 to 5 |

The disposal or utilization of these liquids raises a problem.

Here several ways are possible or to be considered: disposal, reutilization in the same production, and reutilization in another production.

According to the first way, it is possible to simply discharge said liquors into sewers or rivers, with all of the risks of pollution resulting therefrom. In order to avoid such a pollution, it is possible to neutralize the free sulphuric acid by an alkaline agent, lime, for instance. But this is a costly operation involving substantial handling, in particular. Besides, it means the loss of the products of value contained therein. It has also been tried to displace the ammonia from the waste liquor by treating said liquor with a strong base but, by so doing, all of the sulphuric acid is lost.

According to the second way, the applicant has described in prior patents a method for recovering the acid liquors in question, which consists in crystallizing the acid ammonium sulphate contained therein by cooling, if desired, after evaporation under vacuum, in separating light and heavy products, and then in reutilizing the acid solution thus obtained in the production of acrylates or methacrylates, after concentration if necessary.

According to the third way, it has been proposed to utilize said acid liquors for the production of phosphate fertilizers. But, on the one hand, the amount of free acid contained in them (40 to 50%) is too small to attack the phosphates and, on the other hand, the presence in the liquors of a substantial proportion of organic carbonaceous elements and ammonium sulphate, in solution or not, the ammonium sulphate usually amounting to 30 to 35%, hinders the solubilization of phosphates, thus hindering the obtention of a satisfactory output of fertilizers of the desired qualities.

The applicant has overcome these difficulties and, after numerous experiments and researches, has been able to obtain satisfactory results.

According to the present invention, the waste acid liquor resulting from the production of acrylates and methacrylates, which liquor contains sulphuric acid and ammonium sulphate, is treated to raise its acid content to at least 52% by weight and the liquor having the increased acid content is mixed while at a temperature between about 70° C. and about 85° C. with ground phosphate rock in order to produce fertilizer. If the waste acid liquor is used immediately after its production, there is no need of heating it prior to adding acid to it and mixing it with the phosphate rock. On the other hand, if the acid liquor has cooled down from the temperature resulting from the production of acrylates or methacrlates, it is necessary to heat it again to dissolve ammonium sulphate which has deposited from the liquor upon cooling. If the waste acid liquor contains more than about 5% of foreign matter, i.e., the by-products previously mentioned which result from the production of acrylates and methacrylates, it is necessary to separate the by-products from the acid liquor, for example, by decanting, prior to using it in the treatment of the phosphate rock. It is desirable to homogenize the mixture of the waste acid liquor and the added concentrated acid before the mixture is used in the treatment of the phosphate rock. This homogenization can be accomplished in any known manner as, for example, by mechanical stirring or bubbling air through the mixture.

As previously stated, more concentrated acid is added to the waste acid liquor in order to raise its acid content to at least 52% by weight of 100% acid. The preferred acid is sulphuric acid but any other acid may be used which permits the solubilization of the phosphate rock, more particularly nitric acid.

It is indispensable for proper solubilization of the phosphate rock that the acid content of the waste acid liquor be at least 52%. Larger concentrations of acid lead to more solubilized products. The upper limit of concentration of the waste acid liquor used for treating the phosphate is generally about 70%.

The accompanying drawing is a flow sheet which illustrates the process.

Acid waste liquor is fed from a tank 2 to a heater 4 and then to a decanter 6. In the event that the acid waste liquor is at the temperature resulting from the production of acrylates or methacrylates, the heater can be omitted. If the amount of by-products in the waste acid liquor is less than 5%, the decanter 6 can be omitted. In the event, however, that a decanting step is employed, the by-products are discharged from the decanter through a pipe 8 and the waste acid liquor is fed through a pipe 10 and a pipe 12 into a mixer 14 provided with a stirrer 16. Sulphuric acid is fed from a tank 18 through pipe 19 into the mixer 14 in such amount as to raise the acid content of the liquor to at least 52% by weight of 100% sulphuric acid. The liquor of increased acid content is then transferred to a feeder 20 from which it is fed into a mixer 22.

Crude phosphate, for example, natural phosphate rock, contained in a container 24 is ground in a grinder 26, fed to a hopper 28 and then to a feeder 30 which feeds it to the mixer 22. The waste acid liquor and the ground phosphate react in the mixer 22 to form a fertilizer.

After reaction, the material is discharged from the mixer 22 into a receiver 32 and then into a container 34 in which there is rapid maturing, after which it is pulverized in a pulverizer 36 and discharged into a storage bin 38. Gases are withdrawn from the mixer 22, receiver 32 and maturing device 34 by an exhauster 40 and the exhausted gases are washed in a gas washer 42.

The following example further illustrates the process.

A waste acid liquor resulting from the production of methyl methacrylate had the following composition, by weight:

| | Percent |
|---|---|
| $H_2SO_4$ | 32 |
| $(NH_4)_2SO_4$ | 33 |
| Carbon content of impurities | 5 |
| Water | Balance |

This waste acid liquor had a temperature of 30° C. A volume of 7500 liters of this acid liquor was heated to a temperature of 45° C. and then placed in a tank having a capacity of 15 cubic meters. 3000 liters of sulphuric acid of 60° Bé. concentration were added to the waste acid liquor in order to raise its acid concentration to 52% $H_2SO_4$. At that time, the temperature of the mixture was 70° C. and this mixture was then used at that temperature to treat 16 tons of native phosphate rock having a $P_2O_5$ content of 30%. The treatment of the phosphate rock took about 3 to 4 hours.

The present invention not only enables one to make use of waste acid liquors which are difficult and expensive to dispose of but it also leads in a particularly simple way to the production of compound fertilizers. Indeed, all the ammoniacal nitrogen contained in the waste acid liquor is recovered in this form in the final fertilizer. Moreover, it is possible, by introducing all the desired fertilizing agents during or after the reaction between the waste acid liquor and the phosphate material, to produce various complex fertilizers.

Thus, the applicant has advantageously solved the problem of recovering both of the main elements contained in the waste acid liquor, i.e., sulphuric acid and ammoniacal nitrogen, while avoiding the usual difficulties encountered in recovering these elements as crystallized ammonium sulphate and ammonium disulphate, these difficulties involving difficulty of commercial production, the use of expensive apparatus and considerable handling.

The invention is not limited to the preferred embodiment but may be otherwise embodied or practiced within the scope of the following claims.

I claim:

1. The process of treating waste acid liquor resulting from the production of acrylates and methacrylates to produce a phosphate fertilizer product, said liquor containing about 32 to 50% sulphuric acid and containing about 30 to 35% ammonium sulphate, which comprises adding acid which solubilizes phosphate rock to said liquor to raise its acid content to at least 52% by weight, reacting said liquor while at a temperature between about 70° C. and 85° C. with ground phosphate rock, and recovering the resulting phosphate fertilizer product.

2. The process of treating waste acid liquor resulting from the production of acrylates and methacrylates to produce a phosphate fertilizer product, said liquor containing about 32 to 50% sulphuric acid and containing about 30 to 35% ammonium sulphate, and containing organic by-products of said production, which comprises separating said by-products from said liquor, adding acid which solubilizes phosphate rock to said liquor to raise its acid content to at least 52% by weight, reacting said liquor while at a temperature between about 70° C. and 85° C. with ground phosphate rock, and recovering the resulting phosphate fertilizer product.

References Cited in the file of this patent

UNITED STATES PATENTS

| 2,418,203 | Stauffer | Apr. 1, 1947 |
| 2,867,522 | Facer | Jan. 6, 1959 |